United States Patent [19]

Brandon, Jr.

[11] 4,137,454
[45] Jan. 30, 1979

[54] RADIOGRAPHY

[75] Inventor: Robert J. Brandon, Jr., Toronto, Canada

[73] Assignee: Rolls-Royce (1971) Limited, London, England

[21] Appl. No.: 773,794

[22] Filed: Mar. 2, 1977

[30] Foreign Application Priority Data

Mar. 9, 1976 [GB] United Kingdom ............... 9264/76

[51] Int. Cl.² ......................................... G03B 41/16
[52] U.S. Cl. ............................. 250/402; 250/416 TV
[58] Field of Search ............... 250/401, 402, 416 TV, 250/416 R

[56] References Cited

U.S. PATENT DOCUMENTS 3,745,245  7/1973  Yunde ...................... 250/416 TV Primary Examiner—Craig E. Church
Attorney, Agent, or Firm—Stevens, Davis, Miller & Mosher

[57] ABSTRACT

In pulsed X-ray fluoroscopy in which the fluoroscopic screen receiving the X-rays is subsequently observed by a video recording system incorporating an image intensifier, the quality of the video image is impaired because of electrical noise and phosphor flare. The image quality is improved by reducing the gain of the video system synchronously with the occurrence of each X-ray pulse. In addition, the residual disturbance left on the video output is stabilized by synchronizing the video framing cycle frequency with the X-ray pulse frequency.

8 Claims, 8 Drawing Figures

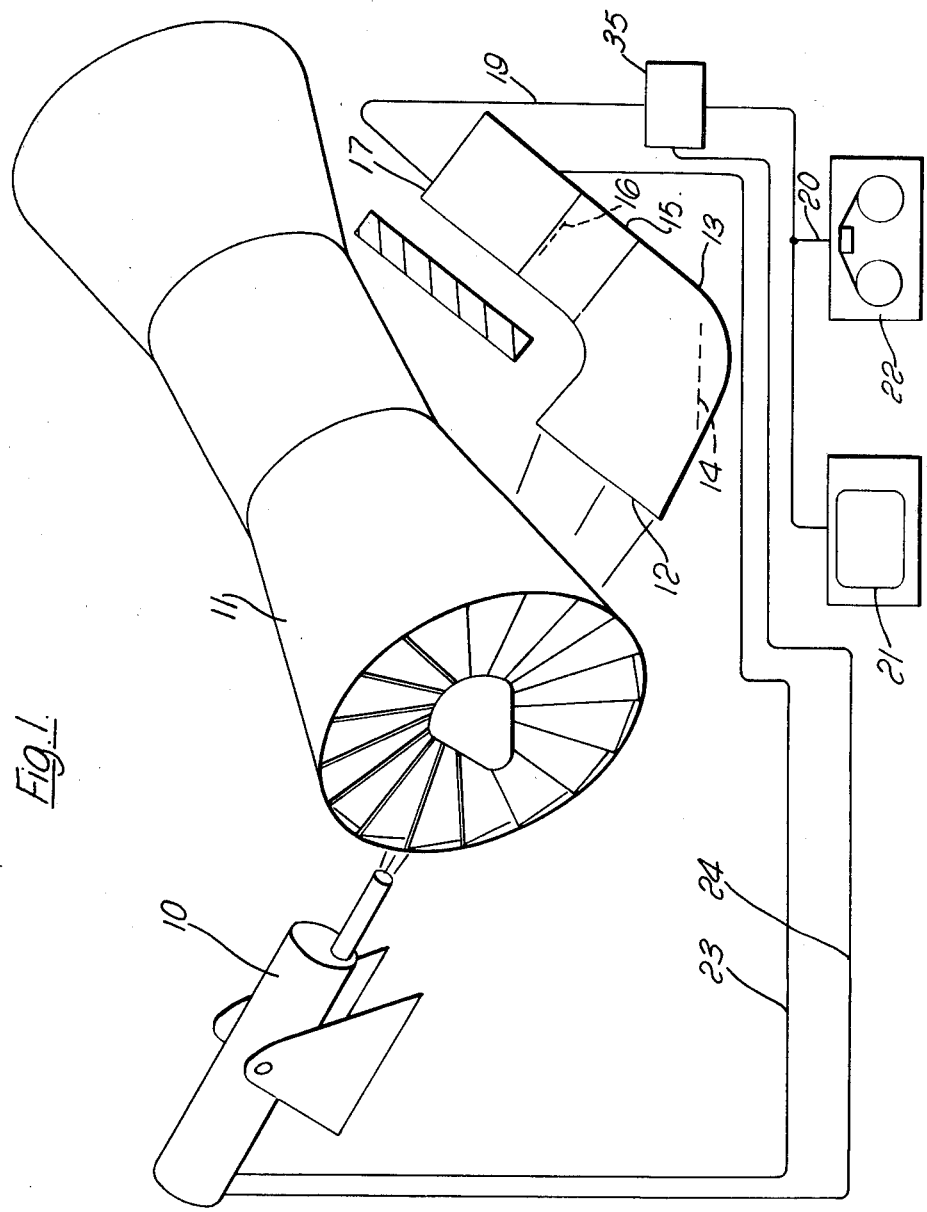

RADIOGRAPHY

This invention relates to improvements in video viewing systems for use with pulsed X-ray fluoroscopy and has particular reference to the improvement of video picture quality when a strong source of X-ray pulses is utilized to produce radiographic images on a fluorescent screen, which images are subsequently viewed either directly or indirectly by a video viewing and recording system.

One such video viewing system that is finding extensive use in the aircraft engine industry, involves the use of a linear accelerator to produce pulses of high energy, 8 Mev, X-radiation, at a power of 1500 rads/minute at one meter. The pulses of X-radiation are directed along chordal lines of operating gas turbine engines to produce fluorescent images on the input screen of an X-ray image intensifier. The images are viewed and recorded by a video camera and recording system. Such a video viewing system which will be understood to comprise the entire system downstream of the input screen of the X-ray image intensifier is described and claimed in U.K. Pat. No. 1,458,013 entitled "Improvements in Diagnostic Apparatus."

The video viewing system is especially useful for allowing qualitative assesments of events within gas turbine engines to be made, in particular for allowing the sequence of engine seal movements to be determined.

It is, however, a problem with the video viewing system that several forms of image degradation are apparent with the video output image as viewed on a video screen. The worst form of image degradation is in the form of broad whitish bands that tend to form on the screen, the bands sometimes rolling down the screen from the top to the bottom edge thereof.

These whitish bands degrade the image quality making it difficult to observe detail through them and generally makes viewing irritating for the operators who wish to observe the video screen.

The present invention seeks to provide apparatus capable of substantially overcoming the problem of the whitish bands.

According to the present invention there is provided a video viewing system suitable for use with pulsed X-ray fluoroscopy comprising means operable synchronously with the X-ray pulses to produce a pulsed output signal and means responsive to said pulsed output signal to reduce the gain of the video viewing system for at least the initial part of each of said X-ray pulses.

Preferably there is further provided means for triggering the X-ray pulses in synchronism with the framing cycle of the video system. Said means for synchronously triggering the X-ray pulses may include an oscillator and a frequency multiplier whereby a range of X-ray pulse frequencies can be obtained for a single framing cycle frequency of the video system.

In a modification there is also provided a variable time delay circuit between the trigger for the X-ray pulse generator and the video camera whereby to permit variation of the phase relationship between the X-ray pulse frequency and the video framing cycle frequency.

Embodiments of the invention will now be described, by way of example only, and with reference to the accompanying drawings in which:

FIG. 1 is a schematic view of a video recording system.

Figure 2A:
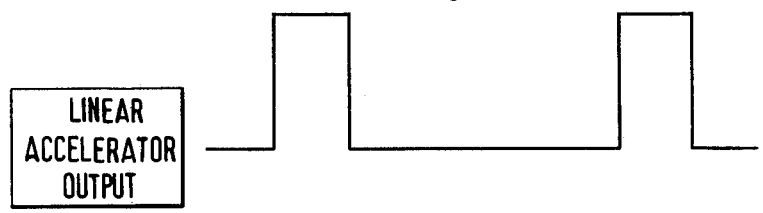
FIGS. 2A–2F are diagrams illustrating relationships between X-ray pulse generation and variations in video recording system gain.

Turning now to FIG. 1, it will be seen that a linear accelerator (10) produces pulses of high energy (8 Mev) radiation of high intensity (1500 rads/minute at one meter) and that these pulses of X-radiation are directed along chordal lines of a gas turbine engine 11. X-radiation leaving the engine is received on a fluorescent screen 12 of an indirect type X-ray image intensifier 13.

The radiographic images forming on the screen of the X-ray image intensifier are subsequently deflected through 90° by an optical system 14 and intensified by an image intensifier 15.

The output screen 16 of the image intensifier forms part of a video system 17 and is viewed by a video camera 18 whose output is relayed via lines 19, 20 and a variable gain video amplifier 35 to a real time viewing screen 21 and to a video tape recorder 22 respectively.

The video tape recorder 22 forms a permanent record of the output from the video viewing system.

In a linear accelerator pulses of X-rays are generated by firstly forming discrete bundles of electrons, subsequently accelerating these electrons to high energies and then allowing them to impinge on a target material thereby generating X-rays.

At the beginning of the X-ray pulse there is much electrical noise generated and also the phosphors on the input screen of the image intensifier "flare" in response to the high initial received dose of X-radiation. These two sources of noise each contribute to the formation of the white bands on the video screen. That the white bands roll down the screen is believed to be due to the fact that an internal oscillator is used to sequence the X-ray pulses from the linear accelerator and that this oscillator is not normally interlinked with the framing cycle frequency of the video system. This gives rise to a frequency mismatch between the linear accelerator pulses and the framing cycle frequency of the video system.

This mismatch has the effect that for successive frames of the video system the whitish band image due to the initial phosphor flare is formed at different line positions on the video screen and these successive different line positions are viewed by the eye as a movement of the whitish bands down the screen.

Both the formation of the whitish bands and their rolling movement down the screen are avoided by interconnecting the linear accelerator and the video system by cables 23, 24. This interconnection will be later further explained with reference to the block diagram of FIG. 3, but first the theoretical basis underlying the arrangement will be enlarged with reference to FIGS. 2A–2F.

In FIG. 2A the shape of the output X-ray pulse from the linear accelerator can be seen. This is essentially a short duration pulse of approximately 2 microseconds duration and at 50 cycles per second this corresponds to a mark/space ratio of 1 to 10,000.

Figure 2B:

In FIG. 2B the effect of the radiation transmitted through the gas turbine and as viewed on the output screen 16 of the image intensifier can be seen. In particular it will be noted that there is a sharp rise 25 in the intensity of illumination of the output phosphors corresponding to the arrival of the pulse from the linear accelerator, referred to as "phosphor flare." The duration of the phosphor flare is relatively short and thereafter the phosphors continue to radiate light at a sensibly constant rate 26 until the arrival of a subsequent X-ray pulse produces a further phosphor flare 27.

Accompanying each X-ray pulse, and of substantially the same time duration, is a burst of electrical noise which despite shielding precautions is very intense and introduces electrical noise into the video system.

Both these sources of noise are dealt with at least in part by periodic reduction or modulation of the gain of the video system to correspond with the production of each X-ray pulse.

Figure 2C:
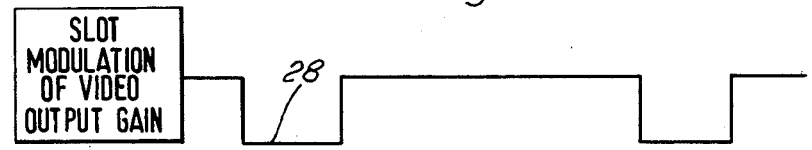
Figure 2D:
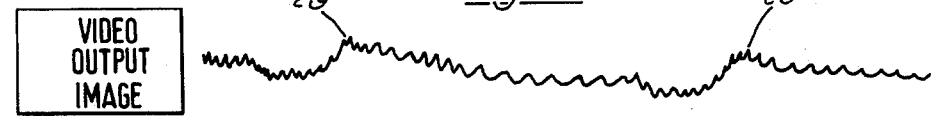

In FIG. 2C the modulation takes the form of a "slot" 28 of substantially the same duration as the X-ray pulse over which period the gain in the video system is reduced from its normal level, of about 20 times, to zero. The effect of this modulation on the video output image can be seen in FIG. 2D from which it is apparent that there is only a small perturbation of the intensity due to the arrival of the X-ray pulses. The whitish bands apparent without the synchronous modulation have substantially been removed.

The small perturbations 29 in intensity is of itself not too severe a problem and is further mitigated by the use of a long persistence screen in front of the output image of the TV monitor and by retention of vision on the retina of the human eye.

Figure 2E:
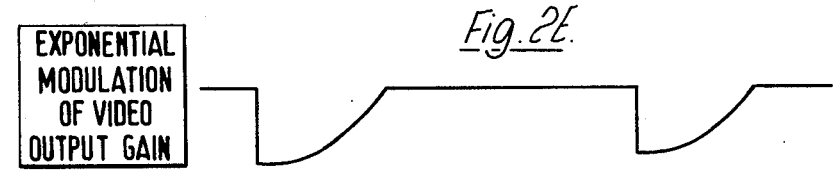
Figure 2F:
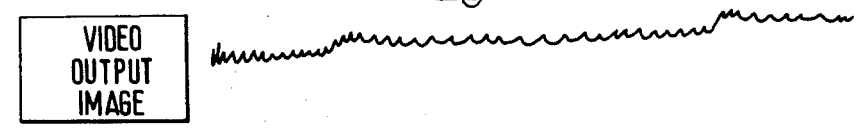

In FIG. 2E is shown an exponential form 30 of synchronous modulation that more nearly approximates the intensity variation in the phosphor flare. This has the twofold benefit of producing a smoother intensity distribution on the video output screen FIG. 2F and of not "losing" so much information from the system by making better use of the information stored in the phosphors of the output screen 16.

Figure 3:
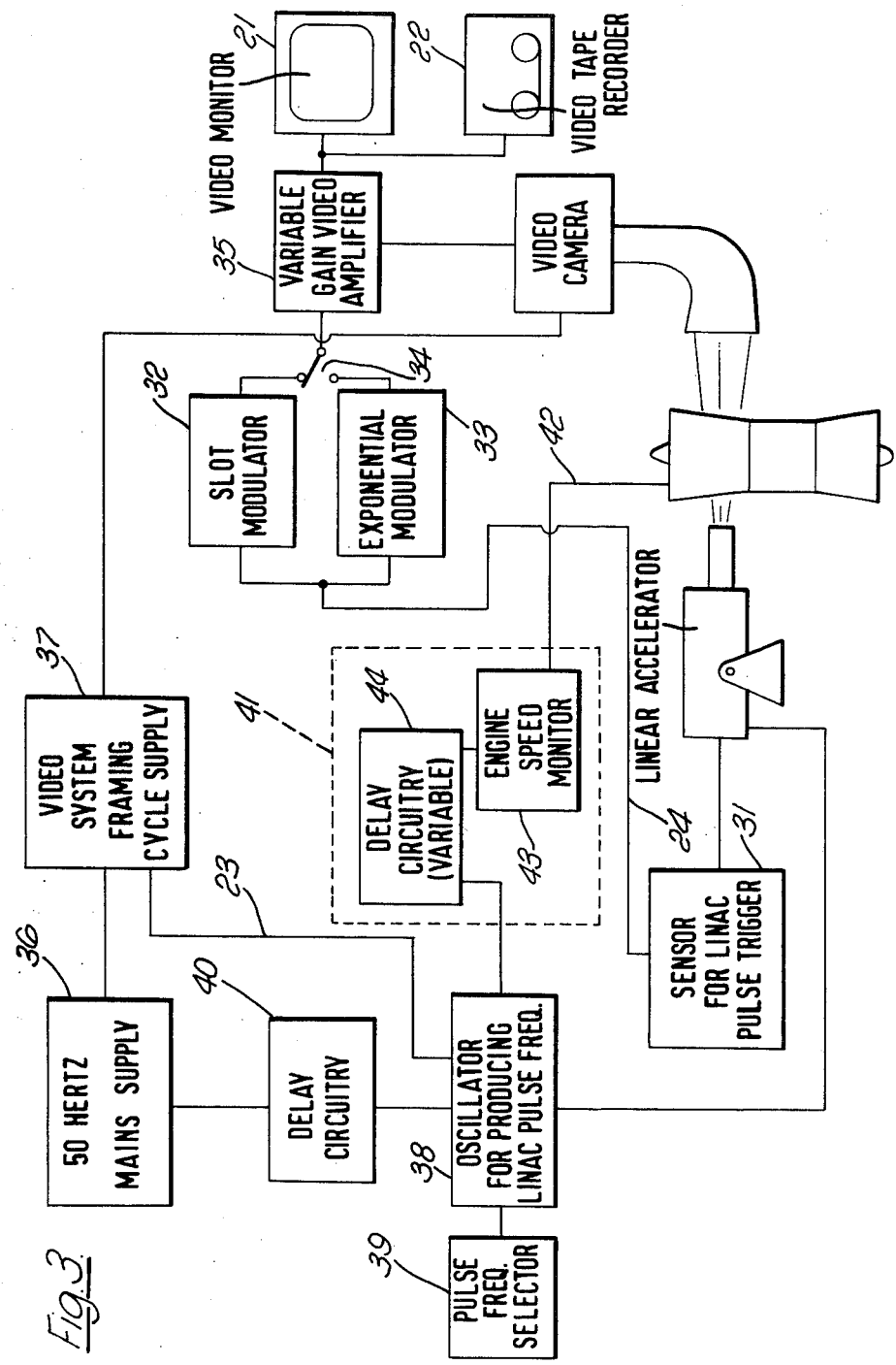
FIG. 3 is a block diagram illustrating the control circuitry for the video recording system and X-ray pulse generator.

Turning now to FIG. 3 the apparatus for achieving this synchronous modulation will be described in more detail.

In order to reduce the intensity of the whitish bands on the video output screen a sensor 31 senses the pulsed electrical signal that triggers the next X-ray pulse from the linear accelerator and passes this pulsed electrical signal via line 24 to the two video output gain modulating circuits 32, 33 one of which, 32, produces the slot modulation of FIG. 2C and the other 33, the exponential modulation of FIG. 2E. Either of the two desired modulating circuits, which are simply alternative kinds of pulse shaper, and well known per se, can be chosen via a switch 34 which connects the respective modulating circuits to the variable gain video amplifier 35 otherwise referred to as a gated video amplifier and itself well known per se. This video amplifier 35 controls the strength of the output signal to the video monitor 21 and the video tape recorder 22.

In order to prevent the residual intensity disturbance 25, 29, that is left after removing the prime cause of the disturbance from rolling down the video output screen the frequency of the X-ray pulses must be synchronised with the framing cycle frequency of the video camera.

This is achieved by deriving both frequencies from the same alternating current electricity supply, namely the mains shown as block 36. Block 36 powers the video system framing cycle supply 37 directly and also supplies power to an oscillator 38 for producing the pulse frequency of the linear accelerator. The oscillator 38 is designed so that the pulse frequency of the linear accelerator is relating to mains supply frequency and can only be increased in steps which are multiples of the mains supply frequency. Were this not so, then the frequency of the X-ray pulses would not be a multiple of the video framing cycle frequency and it would not be possible to stabilize the position of the residual disturbance on the video output screen. The desired pulse frequency of the linear accelerator can be chosen via the frequency selector 39.

Between the main electricity supply block 36 and the oscillator 38 is provided delay circuitry 40 which by adjustment of the time delay between the start of each video framing cycle frequency pulse and each X-ray pulse changes the phase relationship between the two pulses to be adjusted and allows any residual disturbance on the video output screen to be moved either up or down the screen to a position in which it is of least discomfort to an observer.

Also in FIG. 3 can be seen an additional optional block 41 shown in dotted lines. The apparatus in block 41 is used to adapt the oscillator for the linear accelerator for stroboscopic purposes.

To achieve this a pulse probe is fitted to the gas turbine engine 10 and provides via line 42 a measure of the engine frequency to the engine speed monitor 43. This speed is further used to lock the oscillator 38 to the frequency of the engine. It is now no longer possible for the oscillator also to be locked to the main electricity supply frequency and thus the residual disturbance 25, 29 up and down rolling movement of the video output screen has to be tolerated. However, the residual disturbance is now relatively small, and long persistance screens can assist in minimizing its effects so that it is not too obtrusive.

Included in the circuit between the engine speed monitor and the oscillator 38 is a further variable delay circuit 44. The variable delay circuit 44 enables the engine frequency and linear accelerator pulse frequency to be phased relative to one another so that a single rotating component, for example a turbine blade can be stroboscopically viewed. By varying the delay succesive turbine blades can then be succesively examined whilst the engine is running.

It will be apparent to those skilled in the art, that many modifications may be made to the above circuitry. In particular we have chosen to vary the gain of the variable gain video amplifier that supplies the signal to the video monitor 21. At least in the case when slot modulation as per FIG. 2C is required it would also be possible to modulate the gain of the image intensifier 15.

The modification to the gain of the video viewing system could also be achieved by a shutter interposed between the fluorescent screen 12 and the image intensifier 15.

In a further modification adjustments to the modulation applied to the gain of the video viewing system could be made to further reduce any residual disturbance in the video output image.

As a further modification, and because the oscillator frequency controlling the pulsing of the linear accelerator is of the same frequency as the trigger that actually initiates each pulse, the oscillator frequency could be used directly to initiate the modulation of the variable gain video amplifier. With this arrangement however, a further delay circuit would probably be necessary to phase the modulation with X-ray pulses.

I claim:

1. A video viewing system used with a pulsed X-ray fluoroscopy system comprising:
    means for supplying X-ray trigger pulses;
    means responsive to said X-ray trigger pulses for generating pulses of X-rays;
    a fluorescent screen for forming images in correspondence with received X-ray pulses;
    a video signal utilization device;
    a video viewing means for formulating a video signal at a given framing frequency from said fluorescent screen images having picture detail portions corresponding to said images and applying said video signal to said utilization device, said video viewing means including gain control means for varying the amplitude of said video signal;
    means for sensing said X-ray trigger pulses and for producing a signal corresponding to each said trigger pulse; and
    means responsive to said sensor signal for formulating a gain control signal applied to said gain control means to reduce the gain applied to said video signal and thus its amplitude for a time duration corresponding at least to the initial portion of each X-ray pulse.

2. A video viewing system as in claim 1 wherein said means for supplying X-ray trigger pulses supplies said trigger pulses at a frequency which is an integer multiple of said framing frequency.

3. A video viewing system according to claim 1 wherein said gain control means is operative in response to a signal from said means for forming a gain control signal to reduce the gain applied to said video signal to zero for the duration of each X-Ray pulse.

4. A video viewing system according to claim 1 wherein said gain control means is operative in response to a signal from said means for forming a gain control signal to reduce the gain of the video viewing means from its normal operating level to zero at the beginning of each X-Ray pulse and to restore the gain to its operating value exponentially over the duration of the X-Ray pulse.

5. A video viewing system according to claim 1 further comprising means for varying the phase relationship between the X-ray pulse frequency and the video viewing means framing frequency.

6. A video viewing system according to claim 5 wherein said means for supplying X-ray trigger pulses includes an oscillator driven at the video viewing means framing cycle frequency.

7. A video viewing system according to claim 6 wherein a frequency multiplier is interposed between said oscillator and the X-ray pulse generator means.

8. A video viewing system according to claim 1 further comprising means for selecting an X-ray pulse generator frequency which is appropriate for the subject matter being studied by said pulsed X-ray fluoroscopy.

* * * * *